(12) United States Patent  
Braden (10) Patent No.: US 9,997,086 B1  
(45) Date of Patent: Jun. 12, 2018

(54) HANDHELD COMMUNICATION DEVICE AND METHOD(S) OF USE

(71) Applicant: Richard P. Braden, Lone Tree, CO (US)

(72) Inventor: Richard P. Braden, Lone Tree, CO (US)

( * ) Notice: Subject to any disclaimer, the term of this patent is extended or adjusted under 35 U.S.C. 154(b) by 0 days. days.

(21) Appl. No.: 15/826,095

(22) Filed: Nov. 29, 2017

(51) Int. Cl.
*G10L 21/00* (2013.01)
*G09B 21/00* (2006.01)
*G10L 15/26* (2006.01)
*H04R 25/00* (2006.01)

(52) U.S. Cl.
CPC .......... *G09B 21/009* (2013.01); *G10L 15/265* (2013.01); *G10L 15/26* (2013.01); *H04R 25/554* (2013.01)

(58) Field of Classification Search
CPC ... G10L 15/26; H04R 25/554; H04R 2225/61; H04R 25/407; H04R 24/43; H04M 1/72591
USPC ....... 704/201, 235, 203, 271; 381/23.1, 315; 455/414.1, 450
See application file for complete search history.

(56) References Cited

U.S. PATENT DOCUMENTS

| | | | | |
|---|---|---|---|---|
| 6,122,500 A * | 9/2000 | Dent | ................... | H04W 52/288 370/318 |
| 7,957,744 B2 * | 6/2011 | Oesterling | ............ | G07C 5/008 455/412.1 |
| 8,280,434 B2 | 10/2012 | Garg | | |
| 8,995,688 B1 | 3/2015 | Chemtob | | |
| 9,172,790 B2 * | 10/2015 | Garg | ................ | H04M 1/72552 |
| 9,699,632 B2 | 7/2017 | Levien | | |
| 2003/0097262 A1 * | 5/2003 | Nelson | .............. | H04M 1/72522 704/235 |
| 2008/0109208 A1 | 5/2008 | Curry | | |
| 2009/0011806 A1 * | 1/2009 | Man | ....................... | H01Q 1/245 455/575.7 |
| 2009/0074216 A1 * | 3/2009 | Bradford | .............. | H04R 25/554 381/315 |
| 2009/0076804 A1 * | 3/2009 | Bradford | .............. | H04R 25/552 704/203 |
| 2009/0076825 A1 * | 3/2009 | Bradford | .............. | H04R 25/552 704/271 |
| 2011/0102160 A1 * | 5/2011 | Heubel | ................... | G06F 3/011 340/407.1 |
| 2012/0275756 A1 * | 11/2012 | Anderson, Jr. | ...... | G02B 27/017 386/223 |
| 2013/0079061 A1 * | 3/2013 | Jadhav | .............. | H04M 1/72547 455/563 |
| 2013/0188784 A1 | 7/2013 | Engelke | | |
| 2013/0211837 A1 * | 8/2013 | Scott | ................. | H04M 1/72588 704/260 |
| 2013/0268605 A1 * | 10/2013 | Curry | ..................... | H04L 51/38 709/206 |

(Continued)

*Primary Examiner* — Vijay B Chawan
(74) *Attorney, Agent, or Firm* — Leyendecker & Lemire, LLC (57) ABSTRACT

A handheld communication device is described. Embodiments of the handheld communication device include, but are not limited to, a device for the hearing impaired that may be implemented in two modes. A first mode may be implemented when the device user interacts with another individual face to face. The second mode can be implemented when the device user wants to communicate with one or more other users each having a handheld communication device.

16 Claims, 3 Drawing Sheets

(56) References Cited

U.S. PATENT DOCUMENTS

2015/0088501 A1  3/2015  Recker
2016/0111111 A1  4/2016  Levitt
2016/0309011 A1  10/2016 Charugundla
2017/0187874 A1  6/2017  Engelke

* cited by examiner

HANDHELD COMMUNICATION DEVICE AND METHOD(S) OF USE

BACKGROUND

Individuals with hearing disabilities or individuals that are hearing impaired may find it difficult to communicate with people who are not accustomed to communicating with a hearing impaired person. For instance, most people do not know sign language, and as such, a deaf person would have trouble communicating with a person in a retail setting who does not know sign language. In another instance, a hearing impaired individual may find it hard to carry on a conversation in loud situations. Smart phones provide some help by providing a means to communicate via text, but typing out text messages can be time consuming and only works with others who the user knows.

A device that can help a hearing impaired individual communicate in both a one-on-one situation and in a group situation is needed.

DETAILED DESCRIPTION

Embodiments of the present invention include a handheld communication device to enable a hearing impaired individual to communicate with another person or group of persons. Typically, the handheld communication device can be operated in either a first mode or a second mode. The first mode may be implemented for communicating with another individual and the second mode may be implemented for communicating with one or more other users each having a handheld communication device.

The handheld communication device can include, but is not limited to, a housing, an input means, a first microphone, a second microphone, a graphical display, a control module, a transceiver, an antenna, and an analog-to-digital converter. In one embodiment, the handheld communication device can include a touch display in lieu of physical buttons for manipulating operations of the handheld communication device.

Typically, the first microphone can be implemented for use by the owner of the device and the second microphone can be implemented for use by a person the owner is communicating with. The handheld communication device can include speech-to-text software for displaying words spoken into either the first microphone or the second microphone. The speech-to-text software can further be implemented to transcribe signals received via the transceiver.

In one instance, the input means can be a plurality of keys that can be physically actuated buttons. For example, the handheld communication device can include a keyboard. In another instance, the input means can be a virtual keyboard displayed on the screen and manipulated via a touch display.

In a typical implementation, the handheld communication device can be carried around by a hearing impaired individual. The device can be used to help the hearing impaired individual communicate with other persons the individual encounters. Typically, the handheld communication device can include a first mode for interacting with an individual and a second mode for interacting with one or more people remotely. For example, the individual may wear the device to a store and when communicating with a sales associate, the individual may present the second microphone for the sales associate to talk into with the device in the first mode. As the sales associate talks into the microphone, the device can translate the spoken words into text and present the text on the display of the device for the individual to read. Depending on an impairment of the user, the user may then respond by talking to the sales associate or type in a response for the sales associate to read. In the second mode, a group of users each having a handheld communication device can remotely communicate with one another via the handheld communication device. Of note, the user may speak into the first microphone and have the device transcribe the speech into text or the user may enter text via the input means for transmission to other devices.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

The term "channel" or "channels," as used in this specification and the appended claims, can refer to a specific frequency for each channel in a plurality of channels and/or a singular frequency that implements one of several different modulation techniques or encoding schemes to provide a plurality of different channels.

An Embodiment of a Handheld Communication Device

Figure 1:
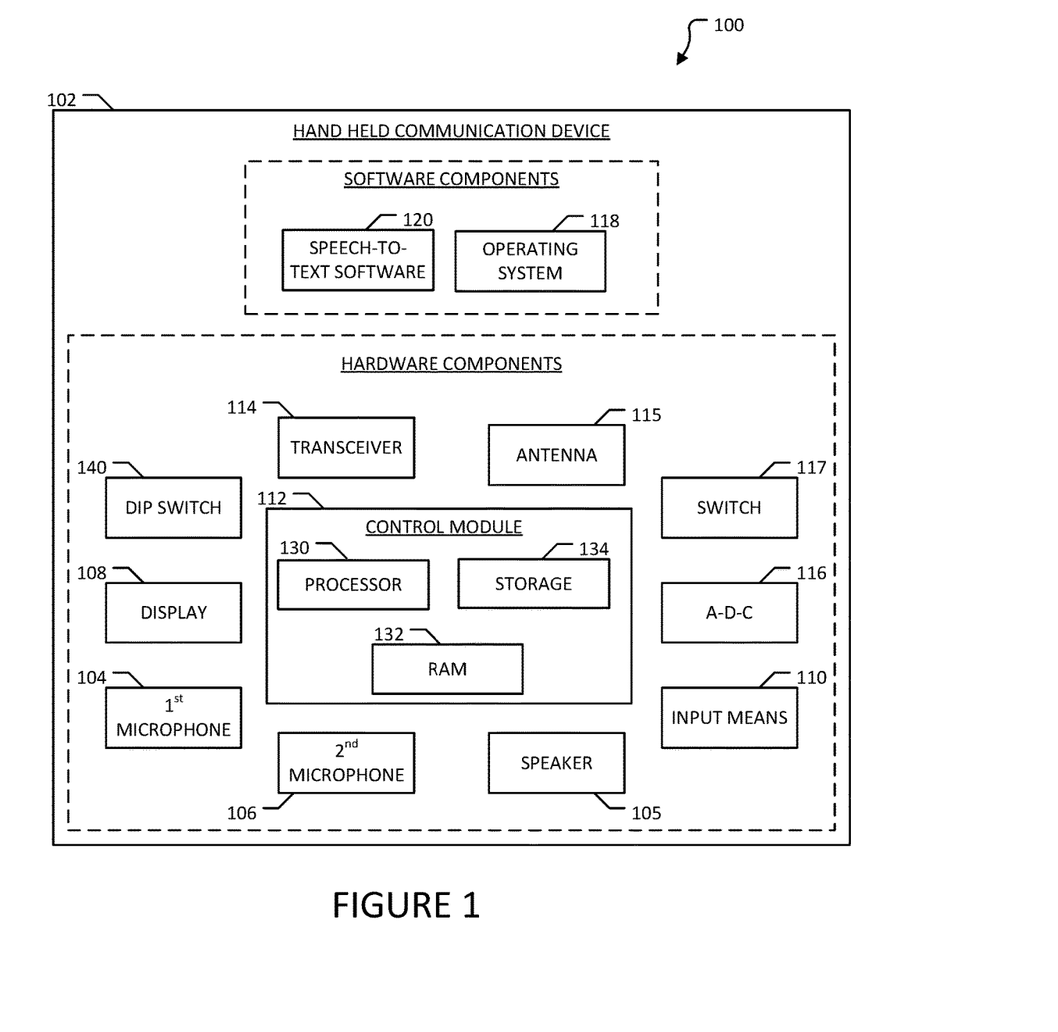
FIG. 1 is a block diagram of a handheld communication device according to one embodiment of the present invention.
Figure 2:
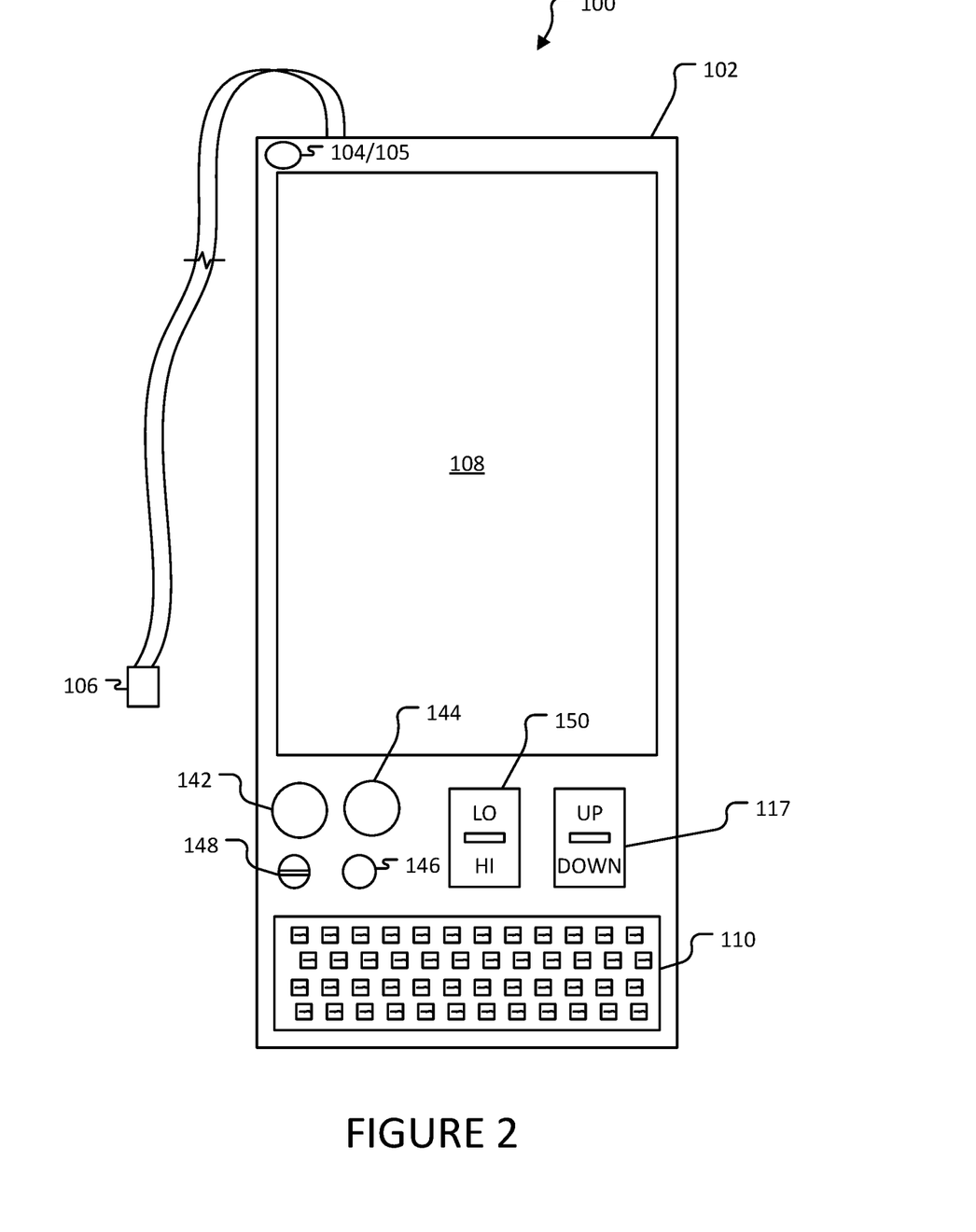
FIG. 2 is a front view of a handheld communication device according to one embodiment of the present invention.
Figure 3:
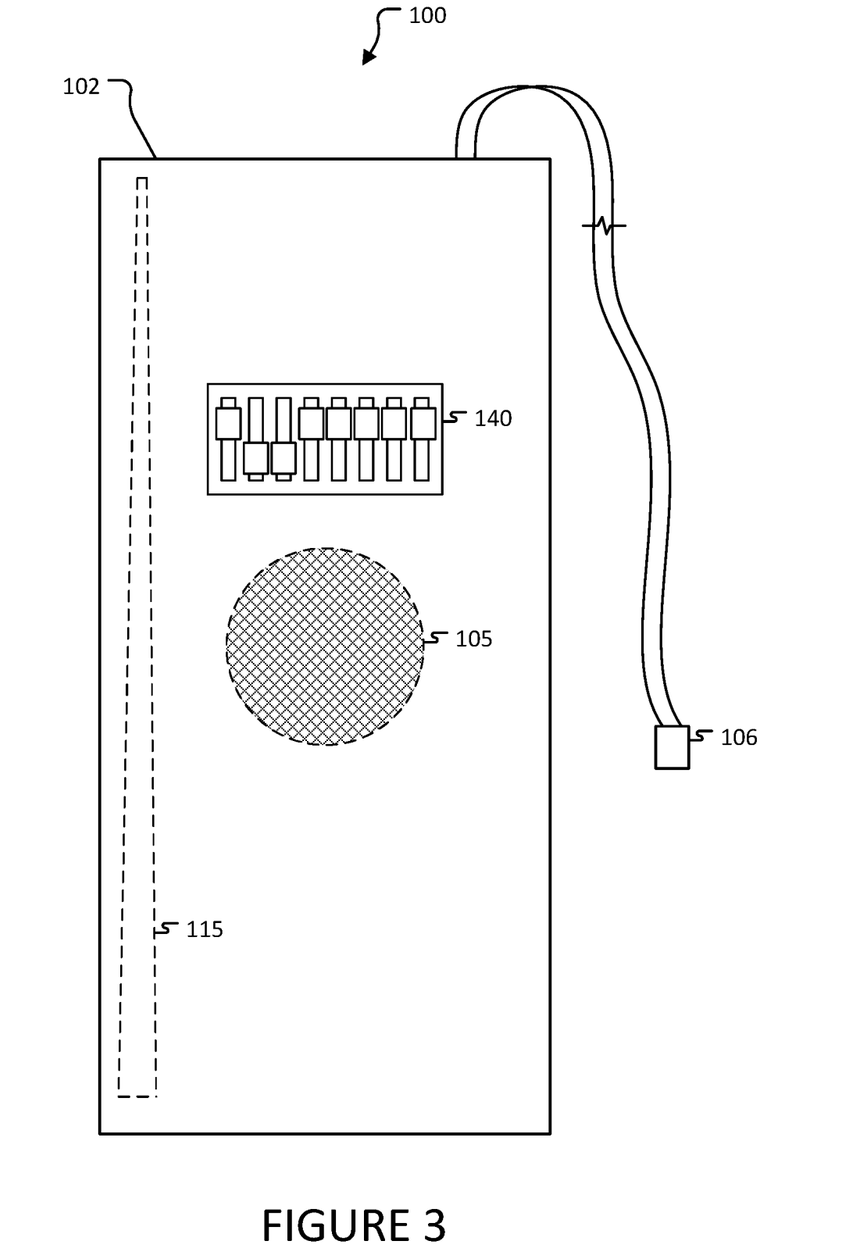
FIG. 3 is a back view of a handheld communication device according to one embodiment of the present invention.

Referring to FIG. 1, a block diagram of an embodiment 100 of a handheld communication device is illustrated. Referring to FIGS. 2-3, a front view of the handheld communication device 100 and a back view of the handheld communication device 100 are illustrated, respectively.

Typically, the handheld communication device 100 can be implemented to help a hearing impaired individual communicate with another person or a group of persons.

As shown in FIG. 1, the handheld communication device 100 can include, but is not limited to, a housing 102, a first microphone 104, a speaker 105, a second microphone 106, a display 108, an input means 110, a control module 112, a transceiver 114, an antenna 115, an analog-to-digital converter (ADC) 116, and a switch 117. The handheld communication device 100 can further include software components including, but not limited to, an operating system 118 and speech-to-text software 120. In one embodiment, the handheld communication device 100 can further include one or more dual in-line package (DIP) switches 140. The DIP switches 140 can be implemented to provide security to communications being transmitted by the handheld communication device 100.

Typically, the switch 117 can be implemented to change the handheld communication device 100 from a first mode to a second mode and vice versa. In one embodiment, the switch can be further implemented to change channels for the second mode. For instance, a channel "1" can be for the first mode, and when the switch 117 is actuated to change channels, any channel between "2" and "50" can be used to select a particular radio frequency for the second mode. Details of each mode and how different components operate in each mode will be described hereinafter. Typically, in the first mode, the handheld communication device 100 can be implemented as a communication device for use between two individuals. In the second mode, the handheld communication device 100 can be implemented by the user as one of a plurality of users each having a handheld communication device. In the first mode, input can be received via the second microphone and in the second mode input can be received via the antenna and transceiver.

The housing 102 can typically be manufactured from a rigid or semi-rigid material. For instance, a rigid plastic may be implemented. In one example, the housing can be injection molded. In one embodiment, the housing 102 can be a unitary housing. In another embodiment, the housing may be comprised of two or more components coupled together.

The first microphone 104 can be located on a front of the device 100 to allow a user to speak into the microphone. The first microphone 104 can be implemented to receive audio from the user to either transmit said audio to another handheld communication device or generate text to display on the handheld communication device 100. In one example, the audio may be transmitted via the transceiver and antenna to other handheld communication devices on the same channel. The receiving handheld communication devices may receive the radio signal and run the signal through an ADC and then speech-to-text software to present the spoken words as text on their device.

In one embodiment, the second microphone 106 can be operatively coupled to the switch 117. Generally, when the first mode is selected via the switch 117, the second microphone 106 may be activated. When the second mode is selected via the switch 117, the second microphone 106 may be deactivated. In one embodiment, the second microphone 106 can include a cable that couples the microphone to an input of the housing 102 that is connected to the switch 117. In another embodiment, the second microphone 106 can be retractably connected to the housing 102. In another instance, the cable can be operatively connected to the switch 117 inside the housing 102 in applications where the second microphone 106 is not removable. As can be appreciated, the cable can allow the second microphone 106 to be used remotely from the handheld communication device 100 by another person. For instance, the second microphone 106 may be disengaged from the housing 102 and used by another person so that the user may keep hold of the handheld communication device 100 to view the display 108. In one embodiment, the second microphone 106 can be wirelessly connected to the handheld communication device 100. For instance, Bluetooth standard may be implemented to operatively connect the second microphone to the handheld communication device 100. In such an embodiment, the housing 102 may include a receptacle for storing the wirelessly connected microphone. Typically, the second microphone may always be paired with the handheld communication device 100 and may include a power source for powering the microphone.

Generally, the second microphone 106 can be implemented when the communication device 100 is in the first mode. As stated previously, the first mode can be implemented in situations where the user is talking one-to-one with another person. In a typical implementation, the other person may speak into the second microphone 106 when responding to the user. Audio captured by the second microphone 106 may be sent to the ADC 116 to convert from an analog signal to a digital signal. The digital signal may then be sent to the control module 112. Once the control module 112 receives the signal, the voice-to-text software 120 may analyze the digital signal and output a signal including text for display by the handheld communication device 100. As can be appreciated, as the other person talks to the user, the handheld communication device 100 may receive the audio and convert the audio into text to be displayed by the handheld communication device 100 for the user to view.

The speaker 105 can be implemented to provide audio to the user of the handheld communication device 100. In some embodiments, the first microphone 104 and the speaker 105 can be comprised of the same components and implemented as both a microphone and a speaker. In one embodiment, the speaker 105 may amplify speech received by the second microphone 106. For instance, the speaker 105 may amplify words of another person speaking into the second microphone 106. In one example, the user of the handheld communication device 100 may hold the speaker 105 proximate their ear to more clearly hear the other person speaking into the second microphone 106. In one instance, the speaker 105 may reproduce audio received via the transceiver 114 and the antenna 115. Typically, the handheld communication device 100 can "read" text displayed on the display 108 to the user via the speaker 105. As shown in FIG. 3, the speaker 105 may be an independent component located on a back of the housing 102.

The display 108 of the handheld communication device 100 can be implemented to display text to a user. In one embodiment, the display 108 can be a touch display. In embodiments including a touch display, the operating system 118 may include software for receiving touch inputs via the touch display and manipulating an operation of the handheld communication device 100 via the touch inputs.

The input means 110 can include, but is not limited to, a physical keyboard, a software keyboard, a touch screen, etc. Typically, the input means 110 can be provided to allow a user to input text into the handheld communication device 100 for transmission to another handheld communication device. For instance, a user may input a text message via the input means 110 and have the handheld communication device 100 transmit the message to all other handheld communication devices on the same frequency (or channel) as the handheld communication device 100. In one embodiment, the input means 110 can include two or more input means. For instance, a first input means can be implemented to input text. A second input means can be implemented to toggle the switch 117 between the first mode and the second mode. As can be appreciated, when the input means is a touch screen, each of the input means can be included with the operating system 118 of the handheld communication device 100. For example, the operating system 118 may include a virtual button to toggle between the first mode and the second mode and selecting a channel. Of note, the channels may be defined by different frequencies for each channel or the channels may be on the same frequency with one of several different modulation techniques or encoding schemes to create a plurality of different channels on said frequency.

The control module 112 can typically include, but is not limited to, a processor 130, random access memory 132, and nonvolatile storage 134. The processor 130 can be a single microprocessor, multi-core processor, or a group of processors. The random access memory 132 can store executable code as well as data that can be immediately accessible to the processor 130. The nonvolatile storage 134 can store executable code and data in a persistent state.

The transceiver 114 can be implemented to transmit signals and receive signals generated by another handheld communication device. For instance, the transceiver 114 can be operatively coupled to the antenna 115 and the control module 112. The antenna 115 can be implemented to generate and receive radio waves.

As previously mentioned, the handheld communication device 100 can include an analog-to-digital converter (ADC) 116 for converting analog signals to digital signals for the speech-to-text software 120. Depending on the mode the handheld communication device 100 may be in, the ADC 116 can be adapted to receive analog signals from the first microphone 104, the second microphone 106, and/or the transceiver 114. Of note, digital signals received by the handheld communication device 100 may bypass the ADC 116 and can be analyzed by the speech-to-text software 120.

The operating system 118 can be stored and run by the control module 112. The operating system 118 can implement the speech-to-text software 120 and can be configured to have the display 108 show text outputted by the speech-to-text software 120. The operating system 118 can include a messaging application for storing, displaying, and creating messages.

As shown generally in FIG. 2, the handheld communication device 100 can further include a power button 142, a transmission "send" button 144, a font selection button 146, a volume control module 148, and a transmission power selection button 150. The power button 142 can be implemented to turn the handheld communication device 100 on and off. Typically, the power button 142 can be operatively connected to a power source and can turn the power source on and off. The transmission "send" button 144 can be implemented to initiate a transmission by a user to send signals to other handheld communication devices. The font selection button 146 can be implemented to change between two or more font types and size combinations to allow a user to select a preferred size of text to read. The volume control module 142 can be implemented to increase or decrease a volume of the speaker 105. In one embodiment, the volume control module 142 can be a set screw configured to adjust volume. The transmission power selection button 150 can be implemented to switch between a low transmission strength and a high transmission strength. For instance, the transmission power selection button 150 can increase a strength of signals sent by the handheld communication device 100. In another instance, in a close proximity setting, the transmission power can be set to low to conserve the power source. Of note, where the handheld communication device 100 implements a touch display, each of the previously mentioned buttons and controls may be manipulated via software.

A Method of Implementing the Handheld Communication Device

A method or process for implementing the previously described handheld communication device 100 is described hereinafter. As mentioned previously, the handheld communication device 100 can be implemented in either the first mode or in the second mode. Depending on a particular situation, a user may implement the device 100 in either the first mode or the second mode. A first process may be implemented when the device 100 is operated in the first mode and a second process may be implemented when the device 100 is operated in the second mode. Typically, a user may select the first mode when wishing to communicate with another individual face-to-face and may select the second mode when interacting with one or more other individuals that have a handheld communication device.

When using the handheld communication device 100, a user may first determine whether to use the handheld communication device 100 in the first mode or in the second mode. In one example, the user can toggle the switch 117 to change between the first mode and the second mode. For instance, the switch 117 may be implemented to switch between the first mode and the second mode and may further be implemented to select a particular channel when operating the handheld communication device 100 in the second mode. A channel "1" may be selected to operate the device 100 in the first mode and channels "2"-"50" may be selected to operate the device 100 in the second mode at a particular frequency, which each channel representing a different frequency.

The user may implement the device 100 in the first mode and then implement the device 100 in the second mode. Alternatively, the user may implement the device 100 in the second mode and then implement the device in the first mode. As can be appreciated, the user may implement the device 100 in either the first mode or the second mode based on a particular social setting or situation. The user may alternate between the first mode and the second mode as needed.

Typically, the handheld communication device 100 can be configured to follow a first process for the first mode and a second process for the second mode. When the device 100 switches between modes the device 100 can implement the appropriate process and the appropriate components. For instance, the first mode may implement the second microphone and the second mode may disable the second microphone and implement the transceiver and the antenna.

As previously mentioned, the handheld communication device 100 can be implemented in the first mode when a user wishes to communicate with another individual that may not be hearing impaired. For example, the hearing impaired user may wish to more easily communicate with another person in a retail setting. In another example, the hearing impaired user may want to ask another person for directions. In the first mode, the handheld communication device 100 can be configured to receive input from the second microphone 106 and present the input as text to the user.

Typically, when the user has selected to operate the handheld communication device 100 in the first mode, the user may use the device 100 to present a question to the other person and receive input from the other person in response to the question asked. The user may present the question to the user either by asking the person the question or presenting the question with the handheld communication device 100. Input from the other person can generally be received by the second microphone.

After asking the question to the other person, the user may present the second microphone to the other person to respond into. The user may imply to the other person to speak into the second microphone 106 to communicate with the user. When the first mode is selected, the handheld communication device 100 can activate the second microphone 106. The second microphone 106 may be configured to capture spoken words from a person. The handheld communication device 100 can be adapted to translate spoken words from another user into text that may be displayed for the user to read.

In a typical implementation, when the other person speaks into the second microphone 106, the second microphone 106 can capture the spoken words and generate a first analog signal based on the spoken words. The first analog signal may then be sent to the ADC 116 to be converted from the first analog signal to a first digital signal. The first digital signal may then be sent to the control module 112 for analyzation and generation of text via the speech-to-text software 120. The speech-to-text software 120 may generate text from the first digital signal and send the text back to the control module 112. The operating system may include an application configured to present the text on the display 108 of the handheld communication device 100.

As can be appreciated, each time the other user speaks into the second microphone 106, the handheld communication device 100 can be configured to translate the spoken words into text for the user to read. As mentioned previously, the second microphone 106 can be detached from the housing 102 of the device 100 allowing the other person to easily use the second microphone 106 to communicate with the user.

The user may select the second mode when wishing to communicate with one or more other users each having a handheld communication device 100. When the user has selected the second mode, the handheld communication device 100 can implement the second process.

As previously mentioned, the user may select a channel "2" to "50" to operate the device 100 in the second mode. The user may select a particular channel based on a group of users who have predetermined a channel to communicate on. After the user has selected the second mode, the user can determine which channel the antenna 115 should be tuned to receive radio waves for. Typically, a group of users may select a channel to communicate on such that only other users on the same channel (or radio frequency) are able to send and receive signals.

In the second mode, the handheld communication device 100 can be configured to receive input from the transceiver 114 and the antenna 115 similar to a walkie-talkie. For instance, a radio wave signal generated by another handheld communication device can be transmitted and received by the handheld communication device 100 assuming the same channel. The handheld communication device 100 may also receive input via the first microphone 104 from the user and transmit the audio signal via the transceiver 114 and the antenna 115 to other handheld communication devices.

In a typical implementation, the handheld communication device 100 may receive a radio wave signal via the transceiver 114 and the antenna 115. For instance, a plurality of handheld communication devices may each be set to the same channel or approximate frequency. The transceiver 114 may then generate a signal based on the received radio wave signal and send the generated signal to the control module 112. The speech-to-text software 120 may then analyze the signal and generate text from the signal to display on the display 108 of the handheld communication device 100 for the user to read.

In some instances, the DIP switch 140 may be implemented to provide a layer of security to transmissions sent by the handheld communication device 100. For instance, where two users wish to speak directly to one another out of a group of users on the same channel, each of the two users may set their DIP switches 140 to the same configuration. As can be appreciated, only those two users or any other users having the same DIP switch 140 configuration would be able to receive transmissions. The transmission "send" button 144 may be implemented by the user to send a message to other users on the same channel as the user.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A method of implementing a handheld communication device, the method comprising:
   providing the handheld communication device, the handheld communication device including:
      a control module;
      a first microphone, wherein the first microphone is removably attached to the handheld communication device while remaining operatively connected to the handheld communication device;
      a second microphone;
      a display;
      a dual in-line package switch;
      a transceiver operatively connected to an antenna; and
      an analog-to-digital converter, wherein the analog-to-digital converter is adapted to receive signals from the first microphone, the second microphone, and the transceiver;
   operating the handheld communication device in a first mode, wherein the first mode includes:
      generating a first analog signal via the first microphone from audio received by the first microphone;
      converting the first analog signal to a digital signal via the analog- to-digital converter;
      sending the first digital signal to the control module; and
      generating text from the first digital signal and displaying the text on the display of the handheld communication device;
   operating the handheld communication device in a second mode, wherein the second mode includes:
      receiving a radio signal via the antenna and the transceiver and generating a second signal;
      sending the second signal to the control module; and
      generating text from the second signal and displaying the text on the display of the handheld communication device;
      wherein the handheld communication device further includes a channel selector for the second mode.

2. The method of claim 1, further comprising the step of:
   configuring the dual in-line package switch into a first configuration.

3. The method of claim 2, further comprising the step of:
   configuring the dual in-line package switch into a second configuration.

4. The method of claim 1, further comprising the step of:
   selecting a first channel to receive communication signals on.

5. The method of claim 4, further comprising the step of:
   selecting a second channel to receive communication signals on.

6. The method of claim 1, wherein when operating in the second mode, further including the steps of:
   receiving audio via a second microphone and generating a third signal;
   transmitting the third signal via the transceiver and the antenna;
   wherein the handheld communication device is adapted to transmit the signal to a second handheld communication device substantially similar to the handheld communication device.

7. A method of implementing a handheld communication device, the method comprising:
   providing the handheld communication device, the handheld communication device including:
      a control module including speech-to-text software;
      a first microphone adapted to receive input from a user;
      a second microphone adapted to receive input from another person, wherein the second microphone is removably attached to the handheld communication device while remaining operatively connected to the handheld communication device;
      a display;
      a dual in-line package switch;
      a channel selector;
      a transceiver operatively connected to an antenna; and
      an analog-to-digital converter, wherein the analog-to-digital converter is adapted to receive signals from the first microphone, the second microphone, and the transceiver;
   selecting a first mode of operation for the handheld communication device;
   presenting the second microphone to a second person, the second microphone being remotely located from the handheld communication device;
   receiving input from the second microphone from the second person and generating a first analog signal via the second microphone;
   converting the first analog signal to a digital signal via the analog-to- digital converter;
   sending the first digital signal to the control module and processing the first digital signal with the speech-to-text software; and
   generating text from the first digital signal and displaying the text on the display of the handheld communication device for the user to read.

8. The method of claim 7, further comprising the steps of:
   selecting a second mode of operation for the handheld communication device;
   selecting a first channel from a plurality of channels to receive radio waves on;
   receiving a radio wave on the first channel via the antenna and the transceiver and generating a second signal;
   sending the second signal to the control module and processing the second signal with the speech-to-text software; and generating text from the second signal and displaying the text on the display of the handheld communication device for the user to read.

9. The method of claim 8, further comprising the steps of:
setting a first configuration for the dual in-line package switch; and
receiving and sending signals to one or more handheld communication devices on the same channel and each having a dual in-line package switch set to the first configuration.

10. The method of claim 7, wherein the handheld communication device further includes a keyboard for inputting text.

11. The method of claim 10, further comprising the steps of:
selecting a second mode of operation for the handheld communication device;
inputting text via the keyboard;
generating a third signal to transmit via the transceiver and the antenna based on the inputted text; and
transmitting the third signal via radio waves.

12. A method of implementing a handheld communication device, the method comprising:
by a user, providing a handheld communication device, the handheld communication device including:
a control module including speech-to-text software;
a first microphone adapted to receive input from the user;
a removably attached second microphone adapted to receive input from a second person, wherein the second microphone remains operatively connected to the handheld communication device when removed from the handheld communication device;
a keyboard;
a dual in-line package switch;
a channel selector;
a display; and
an analog-to-digital converter, wherein the analog-to-digital converter is adapted to receive signals from at least the second microphone;
by the user, inputting a message to be graphically displayed by the display, the message inputted via the keyboard or the first microphone;
by the user, presenting the display of the handheld communication device to the second person;
by the second person, speaking into the second microphone in response to the message displayed by the handheld communication device;
by the handheld communication device:
receiving input from the second microphone from the second person and generating a first analog signal via the second microphone;
converting the first analog signal to a digital signal via the analog- to-digital converter;
sending the first digital signal to the control module and processing the first digital signal with speech-to-text software; and
generating text from the first digital signal and displaying the text on the display of the handheld communication device for the user to read.

13. The method of claim 12, wherein the display is a touch display and the keyboard is a virtual keyboard manipulated by the touch display.

14. The method of claim 12, wherein the method further includes the step of:
by the user, detaching the second microphone from the handheld communication device and presenting the second microphone to the second person.

15. The method of claim 12, wherein the handheld communication device further includes a transceiver and an antenna.

16. The method of claim 15, further comprising the steps of:
by the user, selecting a second mode of operation for the handheld communication device;
by the user, selecting a first channel via the channel selector from a plurality of channels, wherein each of the plurality of channels are adapted to receive a different radio frequency;
by the handheld communication device:
receiving a second signal via the transceiver and the antenna on the first channel;
sending the second signal to the control module and processing the second signal with the speech-to-text software; and
generating text from the second signal and displaying the text on the display of the handheld communication device for the user to read.

\* \* \* \* \*